US010437523B2

(12) United States Patent
Tsirkin

(10) Patent No.: US 10,437,523 B2
(45) Date of Patent: Oct. 8, 2019

(54) SECURE RECEIVE PACKET PROCESSING FOR NETWORK FUNCTION VIRTUALIZATION APPLICATIONS

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

(*) Notice: Subject to any disclaimer, the term of this patent is extended or adjusted under 35 U.S.C. 154(b) by 176 days.

(21) Appl. No.: 15/053,543

(22) Filed: Feb. 25, 2016

(65) Prior Publication Data
US 2017/0249457 A1 Aug. 31, 2017

(51) Int. Cl.
G06F 21/00 (2013.01)
G06F 3/06 (2006.01)
G06F 21/60 (2013.01)
G06F 21/62 (2013.01)

(52) U.S. Cl.
CPC .......... G06F 3/0673 (2013.01); G06F 21/606 (2013.01); G06F 21/6227 (2013.01)

(58) Field of Classification Search
CPC ...... G06F 21/52; G06F 3/0673; G06F 3/0613; G06F 3/0659; G06F 3/0631; G06F 3/0652; G06F 3/0604; G06F 2221/034; G06F 21/606; G06F 21/6227
See application file for complete search history.

(56) References Cited

U.S. PATENT DOCUMENTS 6,148,004 A * 11/2000 Nelson ................. H04L 49/357 370/463
6,742,051 B1 * 5/2004 Bakshi .................... G06F 9/542 719/318
7,770,179 B1 * 8/2010 James-Roxby ..... G06F 17/5054 719/312
7,937,499 B1 * 5/2011 Tripathi ................. G06F 13/24 709/232
9,596,324 B2 * 3/2017 Hass .................. G06F 9/30054
(Continued)

FOREIGN PATENT DOCUMENTS

KR   101543735      8/2015
WO   2015031866     3/2015
WO   2015121750     8/2015

OTHER PUBLICATIONS

Network Functions Virtualisation (NFV); NFV Security; Security and Trust Guidance published Dec. 2014 (57 pages).
(Continued)

Primary Examiner — David Garcia Cervetti
(74) Attorney, Agent, or Firm — K&L Gates LLP

(57) ABSTRACT

A transmit packet processing system includes a memory, one or more processors in communication with the memory, and an operating system. The one or more processors execute a packet processing thread and a rearming thread. The OS maps a receive ring into a first memory of an application and maps the first memory into kernel memory. The packet processing thread reads a receive ring. The packet processing thread retrieves the packet information within the receive ring. The packet processing thread processes the packets. The packet processing thread notifies the rearming thread that a batch size limit is reached and the rearming thread requests the OS to rearm the plurality of descriptors. The OS receives the request and initializes the first descriptor of the plurality of descriptors.

20 Claims, 6 Drawing Sheets

(56) References Cited

U.S. PATENT DOCUMENTS

| | | | | |
|---|---|---|---|---|
| 2002/0069399 A1* | 6/2002 | Miloushey | G06F 8/36 | 717/108 |
| 2004/0024904 A1* | 2/2004 | DiMambro | H04L 67/1002 | 709/238 |
| 2004/0168197 A1* | 8/2004 | Koh | H04H 20/16 | 725/112 |
| 2004/0177164 A1* | 9/2004 | DiMambro | H04L 49/90 | 709/250 |
| 2005/0047439 A1* | 3/2005 | Madajczak | H04J 3/1617 | 370/469 |
| 2005/0097226 A1* | 5/2005 | Tripathi | G06F 13/22 | 709/250 |
| 2006/0072563 A1* | 4/2006 | Regnier | H04L 49/90 | 370/389 |
| 2006/0173885 A1* | 8/2006 | Moir | G06F 9/466 | |
| 2006/0218556 A1* | 9/2006 | Nemirovsky | G06F 9/3851 | 718/104 |
| 2006/0253684 A1* | 11/2006 | Johnson | G06F 12/0292 | 711/203 |
| 2007/0094444 A1* | 4/2007 | Sutardja | G06F 1/3203 | 711/112 |
| 2008/0270363 A1* | 10/2008 | Hunt | G06F 16/2462 | |
| 2009/0073981 A1* | 3/2009 | Coyte | H04L 45/00 | 370/392 |
| 2009/0089564 A1* | 4/2009 | Brickell | G06F 9/30003 | 712/239 |
| 2010/0158015 A1* | 6/2010 | Wu | H04L 49/90 | 370/395.7 |
| 2010/0231600 A1* | 9/2010 | Kaufman | G09G 5/393 | 345/545 |
| 2010/0329259 A1* | 12/2010 | Tripathi | H04L 47/10 | 370/392 |
| 2010/0332698 A1* | 12/2010 | Muller | H04L 49/90 | 710/57 |
| 2012/0120965 A1* | 5/2012 | Khawer | H04L 49/9031 | 370/412 |
| 2012/0151116 A1* | 6/2012 | Tuch | G06F 12/1009 | 711/6 |
| 2012/0151117 A1* | 6/2012 | Tuch | G06F 12/1491 | 711/6 |
| 2012/0151168 A1* | 6/2012 | Tuch | G06F 12/1009 | 711/163 |
| 2013/0160026 A1* | 6/2013 | Kuesel | G06F 9/546 | 719/313 |
| 2013/0201987 A1* | 8/2013 | Lu | H04L 12/2856 | 370/390 |
| 2013/0205043 A1* | 8/2013 | Lu | H04L 12/4633 | 709/244 |
| 2013/0208592 A1* | 8/2013 | Lu | H04L 47/10 | 370/231 |
| 2014/0149633 A1* | 5/2014 | Tsirkin | G06F 9/45558 | 711/6 |
| 2014/0201374 A1 | 7/2014 | Ashwood-Smith et al. | | |
| 2014/0229706 A1* | 8/2014 | Kuesel | G06F 15/76 | 712/31 |
| 2014/0250285 A1* | 9/2014 | Yoon | G06F 13/28 | 711/165 |
| 2015/0063166 A1 | 3/2015 | Sif et al. | | |
| 2015/0113184 A1* | 4/2015 | Stanford-Jason | G06F 13/4286 | 710/106 |
| 2015/0222550 A1 | 8/2015 | Anand | | |
| 2015/0249603 A1* | 9/2015 | Tompkins | H04L 45/74 | 370/392 |
| 2015/0249604 A1* | 9/2015 | Folsom | H04L 45/566 | 370/392 |
| 2015/0249620 A1* | 9/2015 | Folsom | H04L 47/821 | 370/392 |
| 2015/0319086 A1 | 11/2015 | Tripathi et al. | | |
| 2016/0274936 A1* | 9/2016 | Garg | G06F 9/52 | |
| 2016/0364364 A1* | 12/2016 | Fleischer | G06F 13/362 | |
| 2018/0248813 A1* | 8/2018 | Zheng | G06F 12/0875 | |
| 2018/0349270 A1* | 12/2018 | Mittal | G06F 11/1471 | |

OTHER PUBLICATIONS

Battula, "Network Security Function Virtualization(NSFV) Towards Cloud Computing with NFV Over Openflow Infrastructure: Challenges and Novel Approaches", published Sep. 24-27, 2014 (2 pages).

Cautereels, "Optimizing NFV Infrastructure for Packet Processing Intensive Applications", published Jan. 2015 (20 pages).

* cited by examiner

FIG. 3

| Page Table 300 | | |
|---|---|---|
| Page Entry 302A | PFN 310A x0001 | 320A Read - Write | 330A Address of Unallocated Memory x01AF |
| Page Entry 302B | PFN 310B x0002 | 320B Read Only | 330B Address of Receive Ring x01FF |
| Page Entry 302C | PFN 310C X0003 | 320C Read-Write | 330C Address of Transmit Ring x024F |
| Page Entry 302D | PFN 310D x0004 | 320D Executable | 330D Address of Memory Allocated to App x029F |

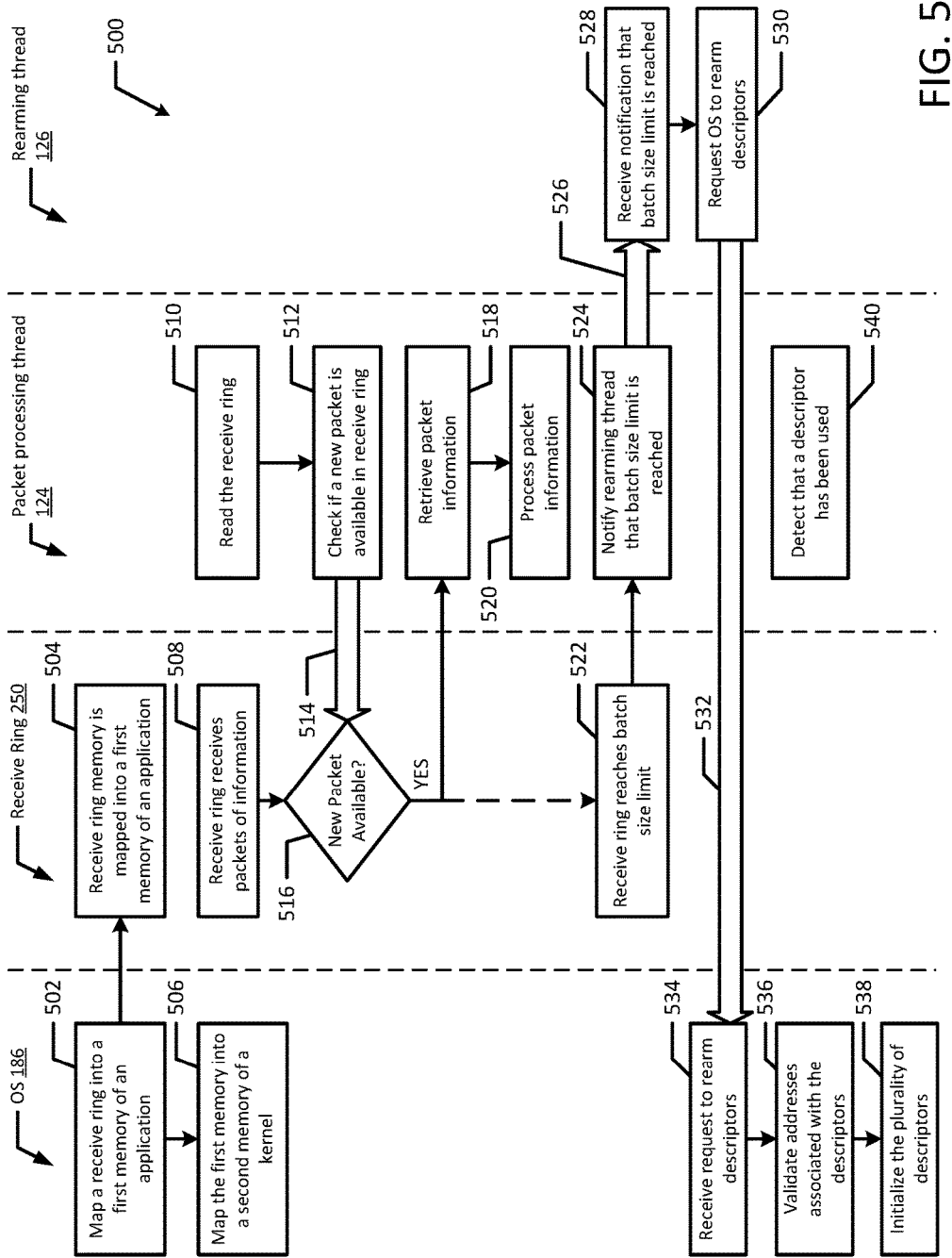

SECURE RECEIVE PACKET PROCESSING FOR NETWORK FUNCTION VIRTUALIZATION APPLICATIONS

BACKGROUND

Computer systems may require packet processing for packets sent to and from applications in userspace. A computer system may run applications and processes used in Network Function Virtualization (NFV). The computer system may use kernel bypass to process packets of data (e.g., networking packets) in the application space in order to avoid the overhead of communicating with the kernel and operating system (OS). For example, a Network Interface Controller (NIC) may transmit and receive packets by Direct Memory Access (DMA) in Random Access Memory (RAM). The NIC may retrieve packet addresses from a device ring or device rings. The transmit status and receive status may be written into the rings to allow for packet processing.

SUMMARY

The present disclosure provides new and innovative systems and methods for receive packet processing. In an example embodiment, a system includes a memory, one or more processors in communication with the memory, and an operating system executing on the one or more processors. The one or more processors are configured to execute a packet processing thread and a rearming thread. The OS is configured to map a receive ring into a first memory of an application. The mapping includes a permission that prevents modification of a plurality of descriptors. The OS is further configured to map the first memory into a second memory of a kernel, receive a request to rearm the plurality of descriptors, and initialize the first descriptor of the plurality of descriptors. The one or more processors are configured to read, by the packet processing thread, a receive ring. The receive ring includes packets, which have packet information. The one or more processors are further configured to retrieve the packet information within the receive ring, process, the packets, and notify, by the packet processing thread, the rearming thread that a batch size limit is reached. The one or more processors are further configured to request, by the rearming thread, the OS to rearm the plurality of descriptors.

In an example embodiment, a method includes mapping, by an operating system (OS), a receive ring into a first memory of an application, where the mapping includes a permission that prevents modification of a plurality of descriptors. The OS maps the first memory into a second memory of a kernel and receives a request to rearm the plurality of descriptors by a rearming thread. The rearming thread is notified that a batch size limit is reached by a packet processing thread. The packet processing thread reads and retrieves packet information. The OS initializes the first descriptor of the plurality of descriptors.

In an example embodiment, a method includes reading, by a packet processing thread, a receive ring. The receive ring includes packets, which have packet information. The packet processing thread retrieves the packet information within the receive ring and processes the packets. The packet processing thread notifies a rearming thread that a batch size limit is reached. The rearming thread requests an OS to rearm a plurality of descriptors.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 3 illustrates a block diagram of an example page table according to an example embodiment of the present disclosure.

FIG. 5 illustrates a flow diagram of an example process for receive packet processing according to an example embodiment of the present disclosure.

DETAILED DESCRIPTION OF EXAMPLE EMBODIMENTS

Techniques are disclosed for providing secure receive packet processing for applications such as network function virtualization applications. In an example embodiment, a receive packet processing system includes an operating system, a kernel, one or more processors configured to execute a packet processing thread and a rearming thread, and one or more interconnected nodes in a kernel space. Additionally, the receive packet processing system may include one or more applications operating in an application space. The receive packet processing system allows receive packet processing without the need to use kernel bypass to process networking packets in application space. In an example embodiment, the packet processing system may include a NIC.

Processing networking packets (e.g., receive packets) may typically include kernel bypass and Direct Memory Access (DMA). For example, a typical Network Interface Controller (NIC) may transmit and receive packets by DMA in Random Access Memory (RAM) where packet addresses are retrieved from a device ring. Then, the transmit and receive status may be written into the ring. However, access to the device rings by applications allows the application space to crash the kernel and results in a system with limited security because applications in the application space may directly access memory available to the application space. Applications with access to the device rings may overwrite something in kernel memory. This may be intentional due to malware, or the application may overwrite kernel memory unintentionally. For example, a crash may result from a situation in which a program such as a user application stops performing its expected functions and/or responding to other parts of the computer system. During a crash, the program or user application may appear to a user to freeze. Additionally, a crash may cause the entire computer system to stall or shut down.

Figure 1:
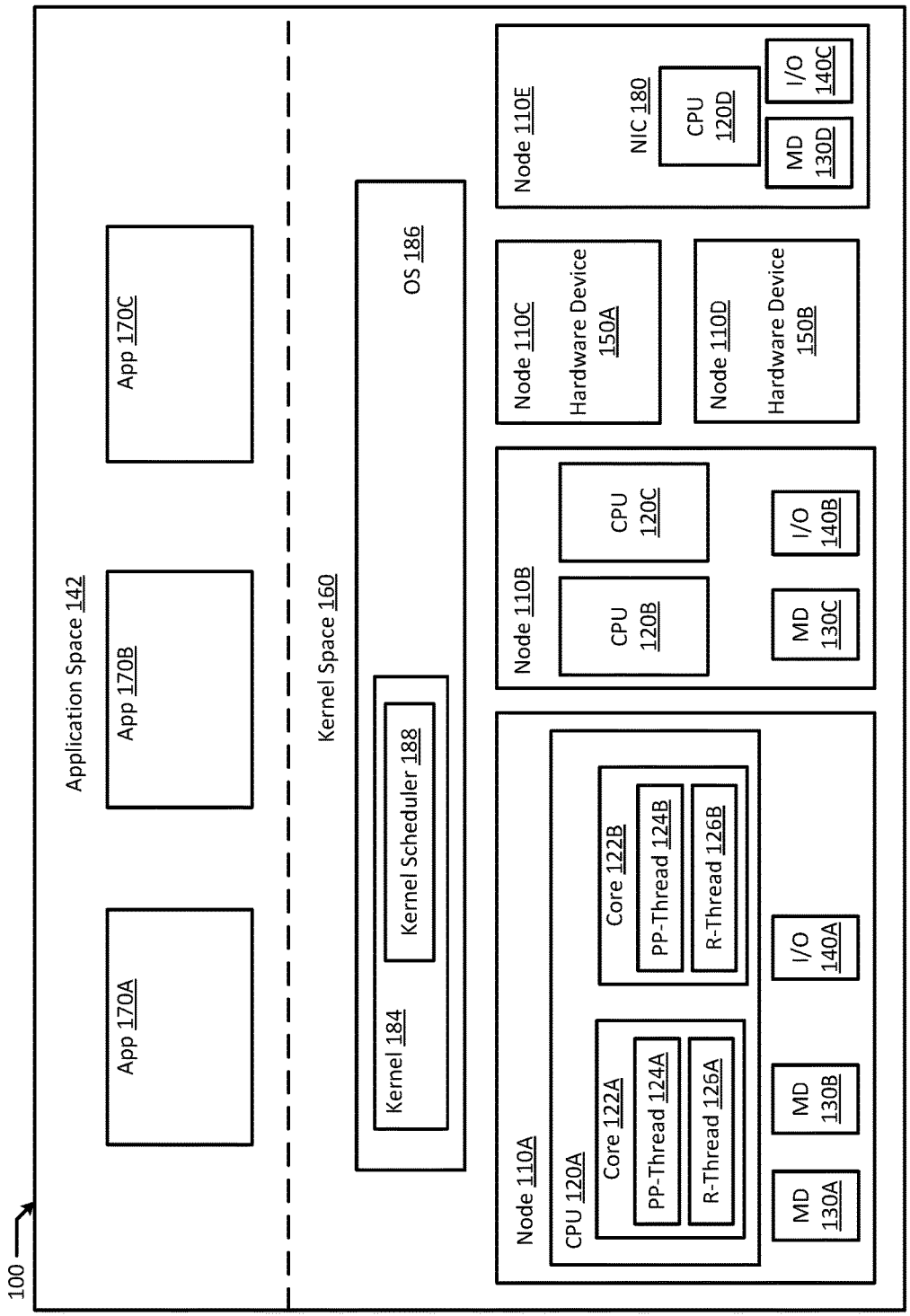
FIG. 1 illustrates a block diagram of an example receive packet processing system according to an example embodiment of the present disclosure.

FIG. 1 depicts a high-level component diagram of an example receive packet processing system 100 in accordance with one or more aspects of the present disclosure. The packet processing system 100 may include a memory (e.g., MD 130A-D), an operating system (OS) 186, and one or more processors configured to execute a packet processing thread and a rearming thread. The OS 186 may include a kernel 184. In an example embodiment, the packet processing system 100 may include a NIC 180.

The kernel 184 may be a program. For example, the kernel 184 may be a program that constitutes the core of the operating system 186. As used herein, the kernel 184 may refer to a privileged software component with the ability to change memory mappings for an application (e.g., Applications 170A-C). Additionally, the kernel 184 may act as a controller of multiple processes including individual user processes within the application space 142. For example, the kernel 184 may perform several tasks such as executing processes and handling interrupts in the kernel space 160. Additionally a user may run programs or applications (e.g., Applications 170A-C) in the application space 142. An application (e.g., Applications 170A-C) may be an application in userspace, an application in a virtual machine, or an application located elsewhere, all of which make up the application space 142. As used herein, an application (e.g., Applications 170A-C) may refer to less privileged software without the ability to change memory mappings for itself. The kernel 184 may provide basic services for the operating system 186 that are requested by other parts of the operating system or by application programs through system calls. For example, the kernel 184 may provide basic services such as memory management, process management, file management, and I/O management.

In various example embodiments, the kernel 184 may be a monolithic kernel, a microkernel, a hybrid kernel, or an exokernel. Additionally, the kernel 184 may include a kernel scheduler 188, a supervisor, an interrupt handler, and a memory manager. In an example embodiment, the kernel scheduler 188 may determine the order various processes are handled on the kernel 184. Additionally, the kernel scheduler 188 may determine how various processes share the kernel's processing time. In an example embodiment, the supervisor may grant use of the computer system to each process after it is scheduled by the kernel scheduler 188. Additionally, the interrupt handler may handle requests from various hardware devices (e.g., Hardware Devices 150A-B) that require the kernel's service. The memory manager may allocate the system's address spaces (e.g., locations in memory) to the users of the kernel's services.

The packet processing system 100 may include one or more interconnected nodes 110A-E. Each node 110A-B may in turn include one or more physical processors (e.g., CPU 120A-C) communicatively coupled to memory devices (e.g., MD 130A-C) and input/output devices (e.g., I/O 140A-C). Each node 110C-D may include a hardware device 150A-B. In an example embodiment, a hardware device (e.g., 150A-B) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. A node 110E may be a network interface controller 180. Network interface controller 180 may include a processor (e.g., CPU 120D), a memory (e.g., memory device 130D), and an input output device (e.g., I/O 140C). The packet processing system 100 may also include one or more applications (e.g., Applications 170A-C) operating within application space 142.

As used herein, physical processor or processor 130A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-D may be provided by one or more local buses of suitable architecture, for example, peripheral component interconnect (PCI).

In an example embodiment, a processor (e.g., CPU 120A) may include one or more cores (e.g., Cores 122A-B). A core 122 may include a packet processing thread (e.g., PP-Thread 124A-B). A core may also include a rearming thread (e.g., R-Thread 126A-B). In an example embodiment, the packet processing system 100 may include two cores (e.g., 122A and 122B). In an example embodiment, the packet processing thread (e.g., PP-Thread 124A) may run on one core (e.g., Core 122A) and the rearming thread (e.g., R-Thread 126B) may run on the other core. In another example embodiment, the packet processing thread 124 and the rearming thread 126 may run on the same core. In an example embodiment, the kernel scheduler 188 may assign the packet processing thread 124 to a first core (e.g. core 122A). The kernel scheduler 188 may assign the rearming thread 126 to a second core (e.g., core 122B). In another example embodiment, the kernel scheduler 188 may assign the packet processing thread 124 and the kernel scheduler 188 to the same core (e.g., core 122A).

Figure 2:
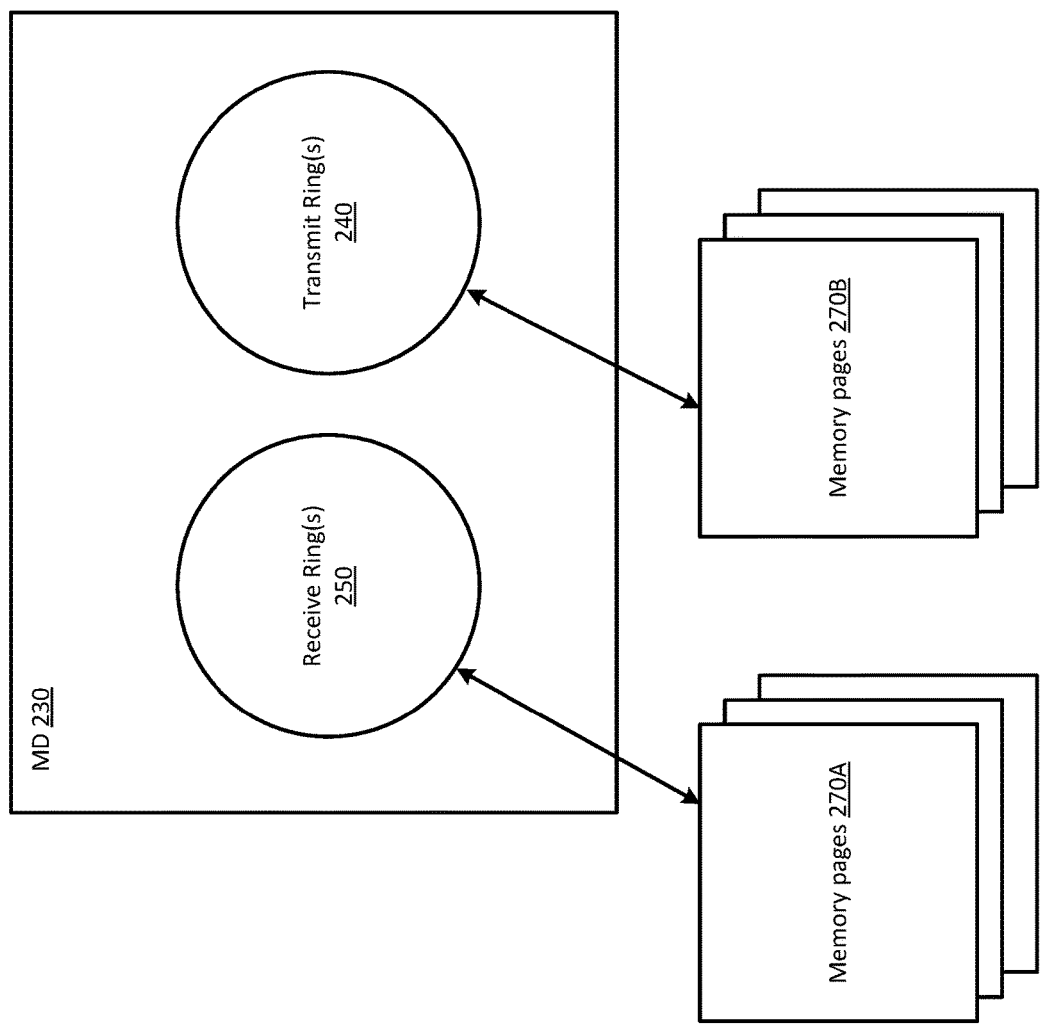
FIG. 2 illustrates a block diagram of an example memory device with transmit rings and receive rings according to an example embodiment of the present disclosure.

FIG. 2 depicts a high-level component diagram of an example memory device 230. In an example embodiment, the memory device 230 may include a plurality of rings such as transmit rings 240 and receive rings 250. In an example embodiment, the plurality of rings may be located in the NIC 180. In another example embodiment, the plurality of rings may be located in memory available to the application space 142. In an example embodiment, the memory device 230 may include a single transmit ring 240 and one or more receive rings 250. In another example embodiment, the memory device 230 may include a single receive ring 250 and one or more transmit rings 240. In another example embodiment, the memory device 230 may include one receive ring 250 and one transmit ring 240. Any other suitable combination of rings for packet processing may be included in the memory device 230. The receive rings 250 may be associated with a first memory. For example, the receive rings 250 may be assigned to a first set of physical memory pages 270A. Additionally, the transmit rings 240 may be associated with a second memory. For example, the transmit rings 240 may be assigned to a second set of physical memory pages 270B. In an example embodiment, the first set of physical memory pages 270A may not be writable by the application 170. Additionally, the second set of physical memory pages 270B may be writeable by the application 170. Preventing the application 170 from writing into the receive rings 250 or first set of physical memory pages 270A ensures that the application 170 cannot intentionally or inadvertently corrupt machine memory, which may lead to crashing the kernel 184.

In an example embodiment, the plurality of rings (e.g., receive rings 250 and transmit rings 240) may be assigned to specific physical memory pages. The plurality of rings may be utilized by an application (e.g., Applications 170A-C) in the application space 142. The specific physical memory pages may have different access rights to increase security of the plurality of rings. For example, some physical memory pages may not be writable by an application (e.g., Applications 170A-C) in the application space 142, which may increase security of the system and may prevent an application (e.g., Applications 170A-C) from crashing the kernel 184. In an example embodiment, at least one memory page of the first set of physical memory pages 270A may hold the receive ring 250. The at least one memory page may have a first portion of memory and a second portion of memory. In an example embodiment, the receive ring 250 may occupy the first portion of memory of the at least one memory page. In an example embodiment, the OS 186 may be configured to erase the second portion of memory that is not occupied by the receive ring 250.

In an example embodiment, an input/output memory management unit (IOMMU) may be programmed to allow a device read access of all of machine memory (e.g., memory available to OS 186). The receive rings 250, which are associated with the first set of physical memory pages 270A may only allow read access. The receive rings 250 may store incoming packets that may be processed by the packet processing thread 124 and sent through the kernel 184. For example, the first set of physical memory pages 270A may not be writeable by the device, and may only allow read access, which may advantageously prevent the device from corrupting machine memory. In another example embodiment, a first page of the first set of physical memory pages 270A may be readable by the application 170 and one of the other pages of the first set of physical memory pages 270A may have an undefined access permission. For example, the receive ring 250 may not require all the memory pages in the first set of physical memory pages. The unused pages may not have an established access permission. In an example embodiment, the first set of physical memory pages 270A may not be writable by the application 170, which may prevent the application 170 from crashing the kernel. In another example embodiment, the transmit ring 240 may be associated with a second memory. For example, the transmit ring 240 may be associated with a second set of physical memory pages 270B. The second set of physical memory pages 270B may be writable by the application 170. In another example embodiment, a second page of the second set of physical memory pages 270B may be writable by the application 170 and one of the other pages of the second set of physical memory pages 270B may not have an access permission established.

FIG. 3 illustrates a block diagram of a page table 300 according to an example embodiment of the present disclosure. In an example embodiment, the page table 300 may be a CPU page table. In general, the OS 186 may manage the memory usage of the applications 170A-C. The physical memory associated with the applications 170A-C may be divided into pages, which are identified with a unique number (e.g., Page Frame Number (PFN) 310A-D).

A page table 300 is a data structure that may be used to store a mapping of memory addresses of the receive rings 250 to memory addresses of the memory available to the application space 142 (e.g., application space memory). Accordingly, address translation may be handled using page table 300. In an example embodiment, the page table 300 stores a mapping of virtual address to physical addresses. In an example embodiment, a computer or CPU may run a virtual machine by executing a software layer above a hardware and below the virtual machine. A virtual machine may be presented as a virtualized physical layer, including processors, memory, and I/O devices. For example, a virtual machine may include virtual processors, virtual memory devices, and/or virtual I/O devices. A virtual machine may execute a guest operating system, which may utilize the virtual processors, virtual memory devices, and/or virtual I/O devices. Additionally, a virtual machine may include one or more applications that run on the virtual machine under the guest operating system. A virtual machine may run on any type of dependent, independent, compatible, and/or incompatible applications on the underlying hardware and OS 186. In an example embodiment, applications run on a virtual machine may be dependent on the underlying hardware and/or OS 186. In another example embodiment, applications run on a virtual machine may be independent of the underlying hardware and/or OS 186. For example, applications run on a first virtual machine may be dependent on the underlying hardware and/or OS 186 while applications run on a second virtual machine are independent of the underlying hardware and/or OS 186. Additionally, applications run on a virtual machine may be compatible with the underlying hardware and/or OS 186. In an example embodiment, applications run on a virtual machine may be incompatible with the underlying hardware and/or OS 186. For example, applications run on one virtual machine may be compatible with the underlying hardware and/or OS 186 while applications run on another virtual machine are incompatible with the underlying hardware and/or OS 186. In an example embodiment, a device may be implemented as a virtual machine.

The page table 300 comprises page entries 302A-D that map PFN 310A-D (e.g., an address of application space memory) with an address 330A-D (e.g., an address of the receive rings 250). Page tables 300 may be used together with any paging data structure to support translation between addresses (e.g., 32-bit linear address space using a two-level hierarchical paging structure, Physical Address Extension mode, INTEL Extended Memory 64 Technology mode, etc.).

In an example embodiment, page tables 300 may include protection identifiers 320A-D. The protection identifier 320A-D may indicate the access status of a page corresponding to the page entry 302A-D of the page table 300. For example, a protection identifier 320A-D may be used to define that a given page is writable (or read-write), write-protected (or read-only), executable (or executable and readable), executable only, etc. For example, as illustrated in the example embodiment in FIG. 3, the page corresponding to page entry 302A, PFN 310A address (x0001), address 330A (x01AF), and protection identifier 320A has been defined in page table 300 as 'Read-Write'. For example, page entry 302A may map PFN 310A (e.g., address of a virtual machine in the application space) to address 330A (e.g., address of physical memory of host OS 186). Page entry 302B may correspond to the receive rings 250 associated with the first set of physical memory pages 270A. For example, the first set of physical memory pages 270A may not be writable by the application 170 such that the protection identifier is 'Read Only'. The read only access may advantageously increase the security of the system by preventing the application 170 or a device from writing into the first set of physical memory pages 270A. Additionally, page entry 302C may correspond to the transmit rings 240 associated with the second set of physical memory pages 270B. For example, the second set of physical memory pages 270B may be writable by the application 170 such that the protection identifier is 'Read-Write'. All applications 170 in the application space 142 may be set to read only access for the receive rings 250, and thus cannot write into the receive rings 250, the application space 142 cannot corrupt kernel memory and can only read kernel information. For example, the application space 142 may be able to corrupt the transmit ring 240 (e.g., by storing illegal addresses there), but cannot corrupt the receive rings 250. Such a configuration allows the packet processing system to support the kernel 184 and enables better security and improved stability in the face of application space bugs or malware. In an example embodiment, the NIC 180 may be used to modify a protection identifier 320A-D of various pages. In addition, the page table 300 may include additional information not shown in FIG. 3 including statistics information, background information, dirty identifiers which indicate that modifications to a page must be written back to disk, etc.

In an example embodiment, one or more page tables 300 may be maintained by the NIC 180. The page tables may map receive ring 250 addresses to addresses that are accessible by the applications (e.g., Applications 170A-C), the OS 186, and/or the OS 186 resources. The sizes of different page tables may vary and may include more or fewer entries than are illustrated in FIG. 3.

Figure 4A:
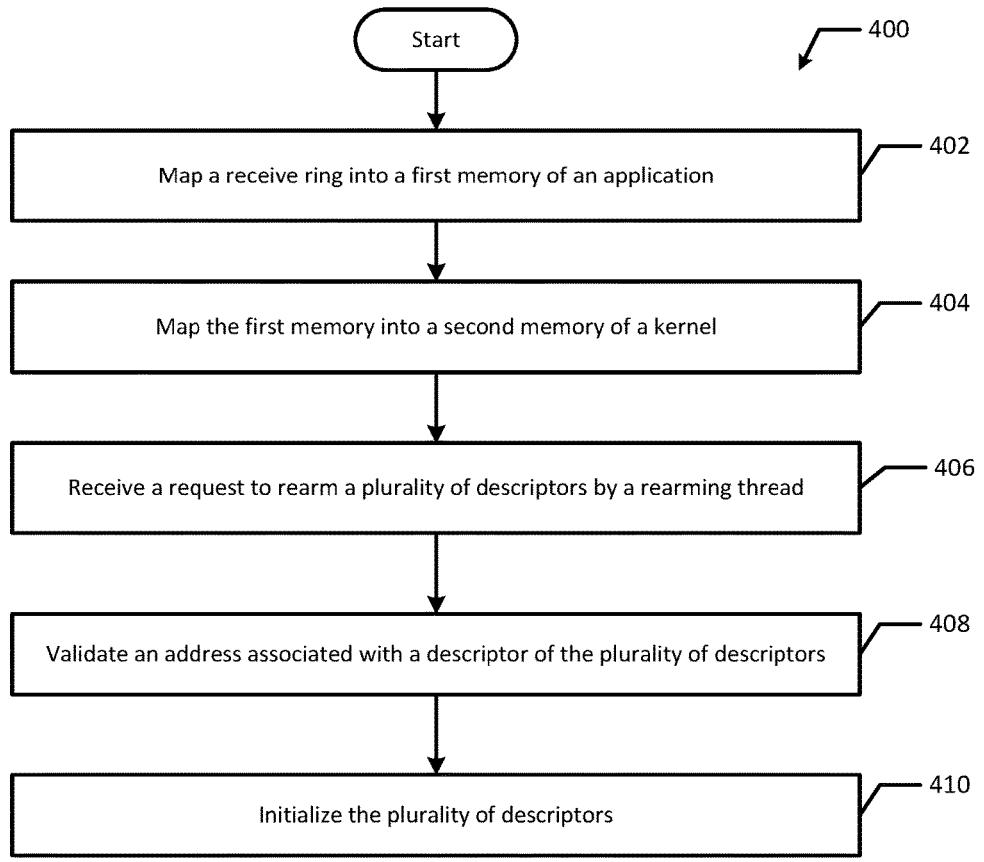
FIG. 4A illustrates a flowchart of an example process for receive packet processing according to an example embodiment of the present disclosure.

FIG. 4A illustrates a flowchart of an example method 400 for receive packet processing in accordance with an example embodiment of the present disclosure. Although the example method 400 is described with reference to the flowchart illustrated in FIG. 4A, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

In the illustrated embodiment, an OS 186 may map a receive ring 250 into a first memory of an application (block 402). In an example embodiment, there may be more than one receive ring 250. For example, there may be a plurality of receive rings 250 in the NIC 180. In an example embodiment, the mapping may include a permission that prevents modification of a plurality of descriptors. For example, the permission may be Read Only. The OS 186 may map the first memory into a second memory of a kernel 184 (block 404). For example, the OS 186 may make the receive ring 250 accessible to the kernel 184 by mapping the first memory into a second memory of the kernel 184. In an example embodiment, the OS 186 may use a page table 300 with permissions for mapping the memory. Then, the OS 186 may receive a request to rearm a plurality of descriptors by a rearming thread 126 (block 406). In an example embodiment, the request to rearm a plurality of descriptors may be sent to the OS 186 after the packet processing thread 124 reaches an predetermined batch size limit. In an example embodiment, the request may be received by the kernel 184 from an application (e.g., App 170A-C). The OS 186 may validate an address associated with a first descriptor of the plurality of descriptors (block 408). In an example embodiment, the OS 186 may validate an address by accessing the address and detecting that the address does not have a page fault. For example, the OS 186 may access the address associated with the first descriptor and detect that the address does not produce a page fault. In another example embodiment, the OS 186 may perform a page walk on the page table 300. For example, the OS 186 may perform a page walk on the page table to confirm that a virtual address relates to a correct physical address. In another example embodiment, the address may be pre-validated such that validation by the OS 186 is unnecessary. Then, the OS 186 may initialize the first descriptor of the plurality of descriptors (block 410). In an example embodiment, the address may be translated to a second address and the OS 186 may initialize the first descriptor with the second address (e.g., translated address).

In an example embodiment, the NIC 180 may retrieve the plurality of descriptors. Additionally, the NIC 180 may write information into memory (e.g., application space memory) according to the plurality of descriptors. For example, the NIC 180 may write a status into a descriptor. Additionally, the NIC 180 may modify the descriptor.

Figure 4B:
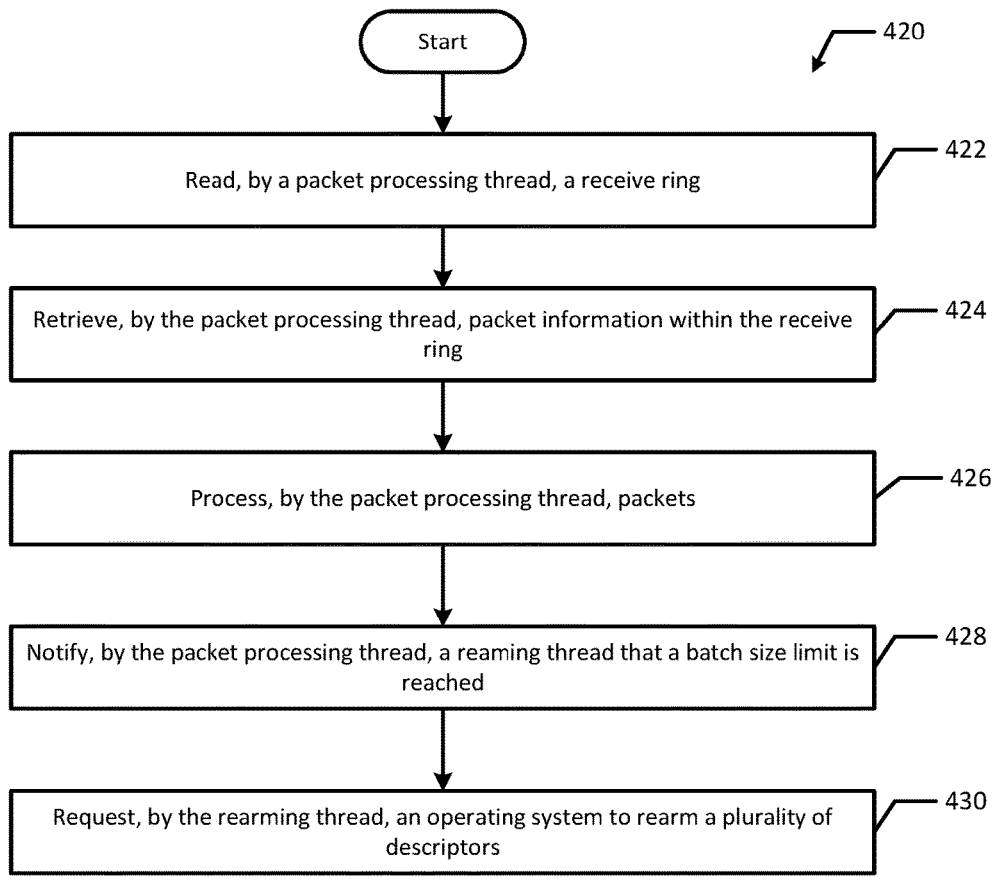
FIG. 4B illustrates a flowchart of an example process for receive packet processing according to an example embodiment of the present disclosure.

FIG. 4B illustrates a flowchart of an example method 420 for receive packet processing in accordance with an example embodiment of the present disclosure. Although the example method 420 is described with reference to the flowchart illustrated in FIG. 4B, it will be appreciated that many other methods of performing the acts associated with the method 420 may be used. For example, the order of some of the blocks may be changed, certain blocks may be combined with other blocks, and some of the blocks described are optional. The method 420 may be performed by processing logic that may comprise hardware (circuitry, dedicated logic, etc.), software, or a combination of both.

In the illustrated embodiment, a packet processing thread 124 may read a receive ring 250 (block 422). In an example embodiment, the packet processing thread 124 may check if any new packets are available in the receive ring 250. If a new packet is available, the packet processing thread 124 may read the new packet. Then, the packet processing thread 124 may retrieve packet information within the receive ring 250 (block 424). For example, the packet processing thread 124 may retrieve packet information from the available packets within the receive ring 250. A packet may include a header, payload, and a trailer. The packet processing thread 124 may retrieve packet information from the header such as the sender information (e.g., sender's IP address), protocol, packet number, etc. The packet processing thread 124 may also retrieve data from the payload of the packet. Then, the packet processing thread 124 may process packets within the receive ring 250 (block 426). For example, the packet processing thread 124 may process a packet by forwarding the packet to a different network device. In an example embodiment, the packet processing thread 124 may process the packet to a specific network standard. Additionally, packet processing may include encrypting the packet, decrypting the packet, transcoding the packet, transrating the packet, and/or transizing the packet. The packet processing thread 124 may notify a rearming thread 126 that a batch size limit is reached (block 428). In an example embodiment, the batch size limit may be determined by the number of packets processed. In another example embodiment, the batch size limit may be determined by the amount of bytes processed. Additionally the batch size limit may be based on the size of the receive ring 250. For example, the batch size limit may be half the number of packets that can fit in the receive ring 250. In an example embodiment, a parallel configuration may be used such that the packet processing thread 124 processes packets from one half of the receive ring 250 while the second half of the receive rings 250 is filled with new packets.

Then, the rearming thread 126 may request the OS 186 to rearm a plurality of descriptors (block 430). For example, the rearming thread 126 may execute a system call to the OS 186 to rearm the plurality of descriptors. In another example embodiment, an interrupt may be used instead of a system call. A packet may fit into a single descriptor. In an example embodiment, a packet may occupy multiple descriptors. A descriptor may point to a memory location. For example, the NIC 180 may read a descriptor from the receive ring 250 and may store the associated packet with the descriptor in the memory location pointed to by the descriptor. In an example embodiment, the packet processing thread 124 may detect that the first descriptor of the plurality of descriptors has been used.

FIG. 5 depicts a flow diagram illustrating an example method 500 for receive packet processing according to an example embodiment of the present disclosure. Although the example method 500 is described with reference to the flow diagram illustrated in FIG. 5, it will be appreciated that many other methods of performing the acts associated with the method may be used. For example, the order of some of the blocks may be changed, certain blocks may be combined with other blocks, and some of the blocks described are optional. The method may be performed by processing logic that may comprise (e.g., circuitry, dedicated logic, etc.), software, or a combination of both.

In the illustrated example embodiment, an OS 186 maps a receive ring 250 into a first memory of an application (blocks 502 and 504). In an example embodiment, the OS 186 may use a page table 300 for the mapping. The OS 186 may map the first memory into a second memory of the kernel 184 (block 506). In an example embodiment, the OS 186 may use a page table 300 for mapping the first memory into the second memory of the kernel 184. The receive ring 250 may receive packets of information (block 508). For example, the receive rings 250 may receive packets of information that may be processed by the packet processing thread 124 and sent through the kernel 184. The packet processing thread 124 may read the receive ring 250 (block 510). In an example embodiment, the packet processing thread 124 may read the receive ring 250 at specific intervals of time. In another example embodiment, the packet processing thread 124 may receive a signal from the OS 186 or the NIC 180 to read the receive ring 250. The packet processing thread 124 may check if a new packet is available in the receive ring 250. (blocks 512 to 516). In an example embodiment, if a new packet is available, the packet processing thread 124 may read the new packet. The packet processing thread 124 may read each new packet as it becomes available. In another example embodiment, the packet processing thread 124 may read packets in batches of packets after a predetermined amount of new packets are available. If a new packet is available, the packet processing thread 124 may retrieve packet information (block 518). In an example embodiment, the packet processing thread 124 may retrieve packet information from the header such as the sender information (e.g., sender's IP address), protocol, packet number, etc. The packet processing thread 124 may also retrieve data from the payload of the packet. Then, the packet processing thread 124 may process the packet information (block 520). In an example embodiment, the packet processing thread 124 may process a packet by forwarding the packet to a different network device. Additionally, the packet processing thread 124 may process the packet to a specific network standard. In another example embodiment, packet processing may include encrypting the packet, decrypting the packet, transcoding the packet, transrating the packet, and/or transizing the packet.

After the receive ring 250 receives a plurality of packets, the receive ring 250 may reach a batch size limit (block 522). In an example embodiment, the batch size limit may be determined by the number of packets process. In another example embodiment, the batch size limit may be determined by the amount of bytes processed. Additionally, the batch size limit may be based on the size of the receive ring 250. For example, the batch size limit may be half the number of packets that can fit in the receive ring 250. Once the batch size limit is reached, the packet processing thread 124 may notify the rearming thread 126 that the batch size limit is reached (block 524 and 526). In an example embodiment, a parallel configuration may be used such that the packet processing thread 124 notifies the rearming thread 126 once half of the receive ring 250 is filled with packets. As the packet processing thread 124 notifies the rearming thread 126, the second half of the receive rings 250 may be filled with new packets, which advantageously improves the efficiency of the system.

The rearming thread 126 may receive the notification that the batch size limit is reached (block 528). Then, the rearming thread 126 may request the OS 186 to rearm descriptors (block 530 and 532). For example, the rearming thread 126 may execute a system call to the OS 186 to rearm the plurality of descriptors. The OS 186 may receive the request to rearm descriptors (block 534). In an example embodiment, the request to rearm the plurality of descriptors may be sent when the batch size limit is reached. In another example embodiment, the request to rearm the plurality of descriptors may be sent to the OS 186 before or after the batch size limit is reached. Then, the OS 186 may validate addresses associated with the descriptors (block 536). In an example embodiment, the OS 186 may validate an address by accessing the address and detecting that the address does not have a page fault. For example, the OS 186 may access the address associated with the first descriptor and detect that the address does not produce a page fault. In an example embodiment, the OS 186 may perform a page walk on the page table 300. For example, the OS 186 may perform a page walk on the page table to confirm that a virtual address relates to a correct physical address. After validation, the OS 186 may initialize the plurality of descriptors (block 538). Additionally, the packet processing thread 124 may detect that a descriptor has been used (block 540). For example, the packet processing thread 124 may detect that a descriptor has been used after the OS 186 rearms the descriptors. In an example embodiment, the packet processing thread 124 may detect that a descriptor has been used when a new packet is received by the receive ring 250.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   one or more processors in communication with the memory; and
   an operating system (OS) including a kernel and executing on the one or more processors configured to:
      map a receive ring into a first memory of an application, wherein the mapping includes a permission that prevents modification of a plurality of descriptors,
      map the first memory into a second memory of the kernel, wherein the kernel controls multiple processes, handles interrupts and has privileges to change the mapping of the application, and based on the permission, the application has less privileges than the kernel and is unable to change the mapping,
      receive a request to rearm the plurality of descriptors, and
      initialize the first descriptor of the plurality of descriptors; and
   the one or more processors configured to execute a packet processing thread and a rearming thread, which are configured to:
      read, by the packet processing thread, a receive ring, wherein
         the receive ring includes packets, and
         the packets have packet information,
      retrieve, by the packet processing thread, the packet information within the receive ring,
      process, by the packet processing thread, the packets,
      notify, by the packet processing thread, the rearming thread that a batch size limit of a predefined quantity is reached, and
      responsive to reaching the predefined quantity, request, by the rearming thread, the OS to rearm the plurality of descriptors.

2. The system of claim 1, wherein the rearming thread is further configured to execute a system call to the OS.

3. The system of claim 1, wherein the one or more processors are configured to detect, by the packet processing thread, that the first descriptor of the plurality of descriptors has been used.

4. The system of claim 1, further comprising a Network Interface Controller (NIC), wherein the NIC is configured to:
   retrieve the plurality of descriptors; and
   write information into the memory according to the plurality of descriptors.

5. The system of claim 1, wherein the OS is further configured to validate an address associated with a first descriptor of the plurality of descriptors.

6. The system of claim 5, wherein the OS is further configured to access the address associated with the first descriptor and detect that the address does not produce a page fault.

7. The system of claim 1, wherein at least one memory page holds the receive ring, the at least one memory page has a first portion of memory and a second portion of memory, and the receive ring occupies the first portion of memory of the at least one memory page.

8. The system of claim 7, wherein the OS is configured to erase the second portion of memory.

9. The system of claim 1, wherein the receive ring is mapped into a first memory of an application using a page table, and the OS is further configured to perform a page walk on the page table to confirm that a virtual address relates to a correct physical address.

10. The system of claim 1, wherein the batch size limit is half of the number of packets that can fit into the receive ring.

11. A method comprising:
   mapping, by an operating system (OS), a receive ring into a first memory of an application, wherein the mapping includes a permission that prevents modification of a plurality of descriptors;
   mapping, by the OS, the first memory into a second memory of a kernel, wherein the OS includes the kernel, the kernel controls multiple processes, handles interrupts and has privileges to change the mapping of the application, and based on the permission, the application has less privileges than the kernel and is unable to change the mapping;
   responsive to reaching a batch size limit of a predefined quantity, receiving, by the OS, a request to rearm the plurality of descriptors by a rearming thread, wherein
      the rearming thread is notified that the batch size limit of the predefined quantity is reached by a packet processing thread, and
      the packet processing thread reads and retrieves packet information; and
   initializing, by the OS, the first descriptor of the plurality of descriptors.

12. The method of claim 11, further comprising:
   validating, by the OS, an address associated with a first descriptor of the plurality of descriptors; and
   translating, by the OS, the address to a second address, wherein the first descriptor of the plurality of descriptors is initialized with the second address.

13. The method of claim 12, wherein validating the address includes accessing the address and detecting that the address does not produce a page fault.

14. The method of claim 11, further comprising:
   retrieving, by an NIC, the plurality of descriptors; and
   writing, by the NIC, information into the plurality of descriptors.

15. The method of claim 11, wherein validating the address includes performing a page walk on a page table to confirm that a virtual address relates to a correct physical address.

16. The method of claim 11, wherein at least one memory page holds the receive ring, the at least one memory page has a first portion of memory and a second portion of memory, and the receive ring occupies the first portion of memory of the at least one memory page.

17. A method comprising:

reading, by a packet processing thread, a receive ring, wherein the receive ring is mapped into a first memory of an application, the mapping includes a permission that prevents modification of a plurality of descriptors, the receive ring includes packets, and the packets have packet information;

retrieving, by the packet processing thread, the packet information within the receive ring;

processing, by the packet processing thread, the packets, wherein the packets are sent through a kernel, the kernel controls multiple processes, handles interrupts and has privileges to change the mapping of the application, and based on the permission, the application has less privileges than the kernel and is unable to change the mapping;

notifying, by the packet processing thread, a rearming thread that a batch size limit of a predefined quantity is reached; and responsive to reaching the predefined quantity, requesting, by the rearming thread, an OS to rearm the plurality of descriptors.

18. The method of claim 17, wherein reading the receive ring includes checking, by the packet processing thread, if a new packet is available.

19. The method of claim 17, wherein processing the packets includes at least one of forwarding a packet to a network device, encrypting the packet, decrypting the packet, transcoding the packet, transrating the packet, and transizing the packet.

20. The method of claim 17, further comprising detecting, by the packet processing thread, that a descriptor of the plurality of descriptors has been used.

* * * * *